Jan. 5, 1954
H. W. JENCKS
2,665,397
SOLENOID
Filed June 30, 1950
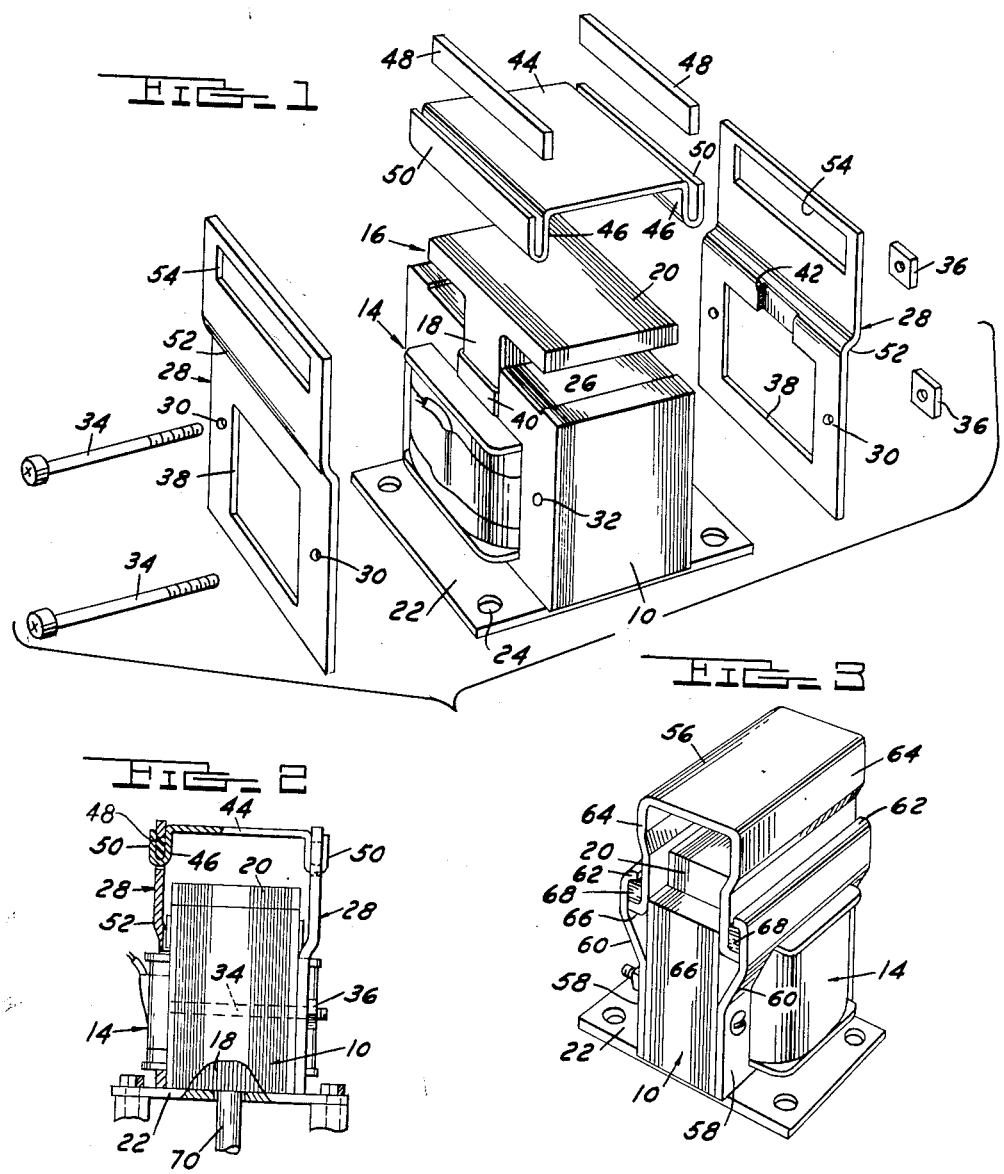
INVENTOR.
HOLLIS W. JENCKS
BY
Burton & Parker
ATTORNEYS Patented Jan. 5, 1954

2,665,397

UNITED STATES PATENT OFFICE 2,665,397

SOLENOID

Hollis W. Jencks, Detroit, Mich., assignor to Carlos C. Cleverdon, doing business as Detroit Coil Company, Detroit, Mich.

Application June 30, 1950, Serial No. 171,369

16 Claims. (Cl. 317—191)

This invention relates to solenoid types of electromagnets and particularly to improvements in a shock absorbing mounting for the armatures of solenoids.

An important object of the present invention is to provide an improved solenoid and particularly to provide an improved assembly of parts for the solenoid which functions as a stop to limit the movement of the armature and to absorb the shock resulting from the sudden stoppage of the armature. Another important object of the invention is to provide a relatively small solenoid having considerably more padding material than heretofore provided for absorbing the shock of the armature which is arranged in a novel manner to improve the cushioning effect without increasing the overall size and height of the solenoid. A further important object of the invention is to provide a novel back stop mounting for limiting the movement of the armature at one end of its stroke which disposes the cushioning material in such a manner that it is subject to a squeezing action rather than a blow as heretofore has been the practice. A still further important object of the invention is to provide a back stop mounting for armatures of solenoids that can be easily modified without alteration of the metallic parts of the assembly to render the solenoid adaptable to different situations.

In carrying out the objects of the invention, a solenoid constructed in accordance with this invention comprises a coil winding, a core structure enclosing the coil winding on two sides thereof, and an armature or plunger having a shank portion reciprocable in aligned openings of the coil winding and the core structure. Detachably secured to the opposite sides of the core structure are side plates which are shaped in a novel manner at their upper ends to form an auxiliary part of a back stop mounting. Associated with the solenoid is a back stop member or plate which extends across the path of movement of the armature or plunger in position to be struck thereby at one end of its stroke. The back stop plate is shaped in a novel manner to have portions thereof extending in juxtaposed position to the upper ends of the side plates. Interposed between the juxtaposed portions of the side plates and the back stop plate are resilient bodies which serve as the shock absorbing means, and instead of being directly struck by the plunger as heretofore has been the practice, they are located on opposite sides of the solenoid spaced from the impact end of the plunger and subject to a squeezing action rather than a sharp blow. An important feature of the invention is the manner of disconnectibly associating the side plates with the back stop plate in order to provide convenient separation of the parts for repair and replacement of parts.

Various other objects, advantages and meritorious features of the invention will become more fully apparent from the following specification, appended claims and accompanying drawings wherein:

Fig. 1 is an exploded perspective view of the parts of a solenoid constructed in accordance with this invention showing same in the order of their assembly, Fig. 2 is a side elevation of the assembled solenoid of Fig. 1 partly broken away in section, and Fig. 3 is a perspective view of a modified form of back stop mounting incorporating the features of the invention.

The present invention relates to improvements in the type of solenoid disclosed in the United States Patent No. 2,466,592, dated April 5, 1949 and particularly to improvements in a back stop mounting for absorbing the shock of a striking plunger. The present invention is shown as applied to the solenoid illustrated in said patent.

In the embodiments of the invention illustrated in the drawing, the electro-magnetic device or solenoid comprises a magnetic frame in the form of a core structure generally indicated at 10 having a substantially rectangular shape and formed of a multiplicity of soft iron laminations. The core frame 10 is provided with a central aperture which may open out on opposite sides of the frame in the manner described in the aforesaid patent. Removably received in the central aperture of the frame is a separate energizing coil unit generally indicated at 14. The coil unit is provided with a central passage therein which opens out through either one or both of the opposite ends thereof. An armature in the form of a reciprocating plunger generally indicated at 16 constitutes the moving part of the assembly and in accordance with the customary practice it may be built up of a multiplicity of relatively thin laminations of magnetic material. The plunger may be T-shaped as shown having a shank portion 18 and a widened head portion 20.

A base plate 22 may be provided for supporting the assembled thus far described and as shown in Fig. 1 may be secured to the bottom side of the core frame 10 with the opposite side marginal portions projecting laterally therefrom. Holes 24 may be formed in the laterally projecting portions of the base plate 22 to facilitate attachment of the solenoid to any suitable support. The core frame 10 is provided in one end with an opening or slot 26 which traverses the width of the frame and opens into the central aperture in which the coil unit 14 is mounted. In properly assembled position of the parts, the opening 26 of the core frame aligns with the central passage of the coil unit. In the assembled position of the plunger the shank portion 18 thereof is reciprocatingly mounted in the aligned opening and passage as shown in Fig. 1.

Associated with the solenoid and forming removable parts thereof are two side plates generally indicated at 28—28. These sides plates are preferably similar in shape and formation to one another and follow the general contour of the side of the core frame against which they abut in assembled position. Each side plate is provided with a pair of holes 30—30 on the opposite sides thereof which align with a pair of holes 32—32 in the core frame which extend entirely therethrough and open out on opposite sides thereof. A pair of bolt members 34—34 extend through the holes 30 of the side plates and completely through the holes 32 of the core frame. By means of nuts 36 on the threaded extremities of the bolts the side plates are held against the core frame as shown in Fig. 2. The lower end section of each side plate is provided with an opening 38, preferably of rectangular formation, which in the assembled position of the plate receives a laterally projecting portion of the coil unit 14 as shown in Fig. 2.

As shown and described in the patent previously referred to, the coil unit may be provided with a sleeve lining disposed in the central passage thereof and through which the shank portion 18 of the plunger reciprocates. The upper end of the sleeve lining projects above the coil unit and enters the transverse opening 26 of the core frame. A side of the upper projecting portion of such a sleeve liner is indicated at 40. Since the sleeve liner 40 projects slightly from the opposite sides of the core frame 10, the side plates 28—28 are preferably cut away or recessed as at 42 for accommodating the same in order to bring the side plates flush against the core frame.

The invention primarily relates to the back stop mounting for limiting the movement of the armature or plunger 16 and in the accomplishment of this invention the two side plates 28—28 cooperate with a back stop member bridging the space therebetween and extending over the head portion 20 of the plunger. In the exploded view of Fig. 1, the back stop member is indicated at 44 and comprises a flat metal plate which has a width such as to straddle the space between the upper ends of the side plates as hereinafter described. The plate 44 is provided with depending side wall portions 46—46 of similar shape and formation which extend in juxtaposed position to the upper ends of the side plates 28—28 and, as will be more particularly described hereinafter, are interlockingly engageable therewith. The intermediate portion of the back stop 44 together with the depending side walls 46—46 forms a member of inverted U-shape formation in cross section.

The solenoid assembly is completed with the provision of shock absorbing means in the form of two similar bodies of resilient compressible cushioning material indicated at 48—48. Each resilient body 48 is preferably in the form of an elongated flat narrow strip of rectangular cross section. In assembled position these strips of resilient material serve to absorb the shock of the impact of the plunger upon the back stop plate 44 and they may be composed of any suitable material for this purpose such as synthetic rubber or leather or a composition combining both of these materials.

The back stop plate 44 is shaped to receive the resilient strips 48—48 and support the same out of contact with the plunger and in position to compressively engage the side plates 28—28. For this purpose the depending side wall portions 46—46 of the back stop plate are similarly shaped at their lower ends to provide laterally projecting portions which extend first outwardly and thence upwardly to form correspondingly shaped flanges 50—50 along each side of the back stop plate. As a result of this construction the opposite sides of the back stop plate are shaped to form upwardly opening channels each capable of receiving one of the resilient compressible strips 48. In the assembled position of the parts, as will be described more particularly hereinafter, each strip 48 is received in its respective channel as shown in Fig. 2 with one longitudinal edge thereof bearing against the bottom of the channel and the opposite longitudinal edge in substantially abutting engagement with the upper edge of the adjacent side plate 28.

In the two illustrated embodiments of the invention the turned down side portions of the back stop plate extend between the core frame 10 and the side plates. To accommodate these turned down portions and to provide a relatively smooth exterior to the device the upper end sections of the side plates are displaced outwardly relative to the core frame in order to provide the necessary clearance therebetween. As shown at 52 each side plate 28 is provided with a jog which offsets the plane of its upper end section outwardly laterally relative to the lower section.

The back stop plate 44 is interlockingly engageable with the upper ends of the side plates 28—28 and supported thereby across the path of movement of the plunger in position to be struck thereby at the end of its outward stroke. To provide the interlocking engagement, the upper end of each side plate 28 in the embodiment illustrated in Figs. 1 and 2 is provided with an elongated opening or slot 54 which extends substantially parallel to the upper edge. The opening 54 of each side plate has a longitudinal dimension slightly greater than the channel-shaped flange of the back stop member but a width slightly less than the wall 46 and the flange 50 of each channel as shown in Fig. 2. The dimensional relation of the elements is such that the flanges 50 of the back stop member cannot be introduced into the openings 54 by a straight-line motion. However, each flanged edge of the back stop plate can be interengaged with the opening 54 of the side plate by initially inclining one at an acute angle to the plane of the other to hook the upper end of the side plate in the channel-shaped flange and then thereafter swinging the side plate to a position perpendicular to the back stop member. In the final assembled position of the parts, the two side plates 28—28 extend vertically and the back stop plate 44 is supported thereby in bridging relation between the upper ends of the two side plates as shown in Fig. 2. In this manner, the back stop plate is floatingly supported by the side plates across the path of movement of the plunger in position to be struck by the head portion 20 thereof when the plunger is retracted.

As a result of the invention, the impact of the plunger on a metallic portion of the back stop plate is transmitted to the resilient strips 48—48 separating the opposite margins of the back stop plate from the upper ends of the side plates. This back stop mounting enables a greater amount of resilient material to be employed without increasing the height or size of the solenoid. It also eliminates direct contact of the armature or plunger with the shock absorbing cushioning material which has been the general practice heretofore in solenoids. Under former operations, the blow with which the plunger engaged the resilient material caused it to wear at a relatively fast rate becoming frayed or mechanically injured from the direct hammer-like blows of the plunger. Mounted in spaced relationship to the impact surface of the back stop plate, the resilient bodies of the present invention are subjected to a squeezing action rather than a blow thus extending their life. Moreover, by virtue of the clearance provided between the upper end of each side plate and the bottom of the flanged channel on the back stop plate, a considerably greater thickness of resilient material may be interposed therebetween. The amount of cushioning of this material can be readily modified to adapt a solenoid to any individual installation by either substituting material of different resiliency for the strips or varying the thickness of material employed. Being substantially completely enclosed between the portions 46 and 50 of the back stop member and the upper end of the side plate, each strip of resilient material is prevented from spreading. Thus, at the time of impact of the plunger the resilient material is subjected to a compressive squeeze rather than a sharp blow. Another advantage of the construction is derived from the fact that the back stop or cross member 44 may be made of material dissimilar to that of the side plates thus allowing more iron to be provided in the magnetic circuit, but eliminating a magnetic connection from one side to the other side of the circuit, thus increasing the pull on the armature. A desirable material for the back stop member 44 is stainless steel.

A modification of the invention is illustrated in Fig. 3. In this embodiment the parts are generally the same as that previously described except that the back stop mounting, including the side plates, is modified. Referring to Fig. 3, the core frame, coil unit, plunger and supporting base plate are constructed in accordance with the previously described embodiment of the invention and are referred to by the same reference numerals. The back stop member corresponding in function to the plate 44 indicated at 56. The two side members corresponding to the side plates of the previously described embodiment are indicated at 58—58.

The side plates 58—58 of the modification are shown as rising to a less height than the side plates 28—28. Each plate 58 is provided with an inclined section 60 intermediate its ends bringing its upper end section in greater spaced apart relation to the adjacent side of the core frame than in the previously described form of the invention. The upper edge of each side plate is inturned to form an overhanging lip or ledge 62. The back stop member 56 is provided with two similarly shaped depending side wall portions 64—64 which are longer than the side wall portions of the previously described embodiment in order to reach below the inturned lips of the side plates 58—58. The lower edge of each side wall portion 64 is bent outwardly to form a lip or ledge 66 disposed in vertically spaced apart relationship below the lip 62 of the adjacent side plate. Positioned between the juxtaposed ledges 62 and 66 are bodies of resilient compressible material 68. These bodies are in the form of elongated strips similar to the resilient strips 48 previously described, but may have a slightly greater lateral dimension, as shown in Fig. 3. Positioned between the overlapping portions of the side plates and the back stop member the resilient bodies 68—68 function to absorb the shock of the plunger against the inside face of the back stop member in a similar manner as the strips 48 previously referred to.

What I claim is:

1. In an electromagnet including a core frame and a magnetically attractable plunger reciprocatingly mounted in the frame, a pair of side plates for the core frame positioned on opposite sides thereof, a back stop plate extending across the path of movement of the plunger in position to be struck by the plunger at one end of its stroke, said back stop plate having opposite marginal portions projecting into the planes of the side plates in underlying relation to the upper marginal portions of the side plates, and resilient means interposed between the underlying marginal portions of the back stop plate and the upper marginal portions of the side plates and operable to absorb the shock of the striking engagement of the plunger against the back stop plate.

2. In an electromagnet including a core frame and a magnetically attractable plunger reciprocatingly mounted in the frame, a pair of side plates for the core frame positioned on opposite sides thereof, a back stop plate extending across the path of movement of the plunger in position to be struck by the plunger at one end of its stroke, said back stop plate having the opposite side marginal portions thereof projecting into juxtaposed positions with respect to the upper marginal portions of the side plates, and resilient means interposed between the juxtaposed marginal portions of the back stop plate and the upper marginal portions of the side plates and functioning to absorb the shock of the plunger upon striking the back stop plate.

3. In an electromagnet including a stator and a winding therefor, said stator being provided with poles extending around the winding on opposite sides thereof and extending upwardly therebeyond, an armature for said magnet including a shank portion adapted to move into said winding and a widened head portion overlying the ends of said poles, a back stop plate extending across the path of movement of the armature in position to be struck by the head portion thereof at one end of its outward stroke, the opposite side margins of said back stop plate extending downwardly and thence outwardly to form a lateral projecting portion on each side of the back stop plate, a pair of side plates secured to the stator and positioned on opposite sides thereof, the upper marginal portions of said side plates being shaped to vertically overlie said lateral projecting portions of the back stop plate, and a flat strip of resilient material positioned in edgewise relation between each lateral projecting portion of the back stop plate and the vertically overlying marginal portion of the adjacent side plate and functioning to absorb the shock of the striking action of the plunger against the back stop plate.

4. In an electromagnet comprising a stator, a winding therefor, detachably secured side plates positioned on the opposite sides of the stator, said stator being formed of iron laminations and providing pole extensions on opposite sides of the winding and rising upwardly therebeyond, an armature for the electromagnet including a shank portion adapted to move into said winding upon energization thereof and a widened head portion overlapping the upper ends of said pole extensions, a back stop plate for restricting the outward movement of the armature having an inverted U-shape formation in cross section, said plate having the closed end portion of its U-shape formation extending across the path of movement of the armature in position to be struck by the head portion thereof, the downwardly extending legs of the U-shaped back stop plate extending adjacent to the upper ends of the side plates, and resilient means interposed between the upper ends of the side plates and the leg portions of the back stop plate and acting to absorb the shock of the armature when the latter strikes the back stop plate.

5. In an electromagnet, a core structure provided with a central opening therein and further provided with a plunger receiving aperture in one end thereof extending into said opening, a coil mounted in the central opening of the core structure and provided with a plunger receiving passage aligning with the aperture in the core structure, a reciprocating magnetic plunger having a shank portion extending through said core structure and into said coil passage and further having a widened head portion disposed on the outside of the core structure, a pair of plates secured to the opposite sides of the core structure, a back stop plate extending across the path of travel of the plunger in position to be struck by the head thereof at the end of its retracting stroke, opposite marginal portions of said back stop plate and the upper end portions of said side plates being cooperatively shaped so that the latter overlie the former in vertically spaced apart relationship, and a body of resilient material positioned between each of said underlying marginal portions of the back stop plate and the upper end portion of the adjacent side plate for absorbing the shock of the striking plunger.

6. In an electromagnet, a core structure formed of soft iron laminations and provided with a central opening therein and further provided with a plunger receiving aperture in one end thereof extending into said opening, a removable coil unit mounted in the central opening of the core structure and provided with a plunger receiving passage aligning with the aperture in the core structure, a reciprocating magnetic plunger having a shank portion extending through said core structure and into said coil passage and further having a widened head portion disposed on the outside of the core structure, a pair of side plates removably secured to the opposite sides of the core structure, a back stop plate positioned to extend across the path of travel of the plunger and adapted to be struck by the head of the plunger at the end of its retracting stroke, said back stop plate having the opposite marginal portions thereof adjacent to said side plates bent downwardly and extending below the upper ends of the side plates, and an elongated strip of resilient material positioned between each bent marginal portion of the back stop plate and the upper end portion of the adjacent side plate and acting to absorb the shock of the striking plunger.

7. In an electromagnet, a coil winding and a surrounding core structure having aligned openings, a magnetically attractable plunger having a shank portion extending through said aligned openings and further having a widened head portion disposed on the outside of the core structure, a pair of side plates removably secured to the opposite sides of the core structure, a back stop plate extending across the path of movement of the plunger in position to be struck by the head portion thereof at the end of its outward stroke, said back stop plate bridging the space between said side plates and provided with depending side wall flanges shaped to underlie the upper ends of the side plates, and bodies of resilient material interposed between the depending side wall flanges of the back stop plate and the upper ends of the side plates and functioning to absorb the shock of the plunger at the time it strikes the back stop plate.

8. In an electromagnet including a coil winding, a core frame surrounding the coil winding and a reciprocating plunger having the shank portion thereof extending into the coil winding; a pair of side plates secured to the opposite sides of the frame each having the upper end section thereof displaced outwardly from the core frame; a back stop plate extending across the path of travel of the plunger in position to be struck thereby at the end of its outward stroke, said back stop plate having depending marginal portions entering the space between the displaced upper end sections of the side plates and the core frame, and a strip of resilient compressible material positioned between and engaging each depending portion of the back stop plate and the displaced upper end section of the adjacent side plate, the two strips of resilient compressible material functioning to absorb the shock of the striking plunger against the back stop plate.

9. A shock absorbing mounting for a solenoid comprising, in combination, a pair of side plates secured to opposite sides of the solenoid, a back stop plate bridging the space between the upper ends of the side plates and adapted to be struck by the armature of the solenoid at one end of its stroke, said back stop plate having each side marginal portion adjacent to said side plates depending downwardly and thence laterally to form an outwardly projecting portion alongside of each side plate, said side plates having their upper end portions shaped to extend over the lateral projecting portions of the back stop plate in vertical spaced relation thereto, and a body of resilient compressible material positioned between each laterally projecting portion of the back stop plate and the upper end of the adjacent side plate and serving as a shock absorbing medium for the back stop plate.

10. A shock absorbing mounting for a solenoid comprising, in combination, a pair of side plates secured to the opposite sides of the solenoid, each provided with a slot extending substantially parallel to the upper end of the plate, a back stop plate positioned across the path of travel of the armature of the solenoid to be struck by the armature at one end of its stroke, said back stop plate having the opposite side marginal portions thereof bent downwardly and thence outwardly and passing through said slots of the side plates, and resilient compressible material located in said slots of the side plates and positioned between the upper edge of each slot and the portion of the back stop plate passing therethrough for absorbing the shock of the armature against the back stop plate.

11. A shock absorbing mounting for a solenoid comprising, in combination, a pair of similarly formed substantially rectangularly shaped side plates secured to the opposite sides of the solenoid, each of said side plates being provided with a slot extending substantially parallel to the upper edge of the plate, a back stop plate positioned across the path of travel of the armature of the solenoid to be struck by the armature at one end of its stroke, said back stop plate having two opposite side marginal portions formed into upwardly opening channels disposed within the slots of the side plates, and a body of resilient material interposed between the base of each of said channels and the upper edge of the slot within which it is disposed and adapted to absorb the shock of the impact of the armature against the back stop plate.

12. A shock absorbing mounting for a solenoid comprising, in combination, a pair of similarly formed substantially rectangularly shaped side plates secured to the opposite sides of the solenoid, each of said side plates having an inturned lip on the upper end portion thereof, a back stop plate adapted to be positioned across the path of travel of the armature of a solenoid and be struck by the armature at one end of its stroke, said back stop plate having two opposite side marginal portions bent downwardly so as to extend between the side plates and the solenoid and then bent outwardly to form laterally projecting lips underlying the inturned lips of the side plates, and a body of resilient compressible material on each of said sides of the solenoid and engagingly interposed between the inturned lips of the side plates and the laterally projecting lips of the back stop plate.

13. In a solenoid including a coil winding, a core frame surrounding the coil winding, and a reciprocating plunger having a portion thereof extending into the coil winding, a back stop plate positioned across the path of travel of the plunger and adapted to be struck by the plunger at one end of its stroke, said back stop plate having two opposite side wall sections depending downwardly along opposite sides of the core frame and each terminating in a lateral extending portion, said core frame having opposite sides provided with portions superimposing in vertical spaced relationship the lateral extending portions of the back stop plate, and a flat elongated strip of resiliently cushioning material interposed between said lateral portions of the back stop plate and the superimposed portion of the side and being arranged with the plane thereof extending parallel to the direction of travel of the plunger, said strips cooperating to absorb the shock of the impact of the plunger against the back stop plate.

14. In a solenoid including a coil winding, a coil frame surrounding the coil winding, and a reciprocating plunger having a shank portion thereof extending into the coil winding, a back stop plate extending transversely across the path of travel of the plunger in position to be struck by the plunger at one end of its stroke, a yieldable mounting for the back stop plate comprising a pair of elongated flat strips of resilient material arranged in superimposing relation to marginal portions of the back stop plate on opposite sides of the path of travel of the plunger, said flat strips of resilient material being disposed with their planes extending parallel to the direction of travel of the plunger and with one longitudinal edge thereof in bearing contact with said marginal portions of the back stop plate, and means carried by the core frame and superimposing the strips of resilient material in bearing contact with the opposite longitudinal edges thereof, said resilient strips cooperating together to absorb the shock of the impact of the plunger against the back stop plate.

15. An electromagnet comprising an energizing coil having a hollow core, a stator structure having legs extending along the outside of said coil and parallel to the axis of the coil, a movable plunger type armature with a shank and a head, the shank being aligned to be drawn into said hollow core in response to energization of said coil, and the head being adapted to be in magnetic circuit relation with said legs, the path of armature movement being substantially in line with said axis, a bumper of rigid material disposed across said path and located in a direction from said head opposite to the shank side of the head, at least a pair of separate resilient shock absorbers on opposite sides of said path resiliently linking opposite sides of the bumper to the stator structure, said shock absorbers being adapted to yieldingly resist relative movement between the bumper and the stator structure when the armature head strikes the bumper upon armature movement in a direction opposite to its movement when the coil is energized.

16. In a solenoid having a hollow core and frame assembly, a solenoid plunger disposed within the hollow core and frame for reciprocation, a back stop plate extending across the path of movement of the plunger to be struck thereby at one end of the stroke of the plunger, stop means carried by the frame and overhanging the back stop plate, and resilient cushioning means interposed between said stop means of the frame and the back stop plate to resiliently resistingly yield to absorb the impact of the plunger against the back stop plate.

HOLLIS W. JENCKS.

References Cited in the file of this patent
UNITED STATES PATENTS

| Number | Name | Date |
|---|---|---|
| 1,811,923 | Flintermann | June 30, 1931 |
| 2,117,264 | Workman | May 10, 1938 |
| 2,180,705 | Fry | Nov. 21, 1939 |
| 2,459,078 | Jeffrey | Jan. 11, 1949 |
| 2,506,188 | Alviset | May 2, 1950 |